United States Patent
Casado et al.

(10) Patent No.: US 8,914,182 B2
(45) Date of Patent: Dec. 16, 2014

(54) NETWORK OF UNMANNED VEHICLES

(71) Applicant: The Boeing Company, Chicago, IL (US)

(72) Inventors: Enrique Juan Magana Casado, Madrid (ES); David Scarlatti, Madrid (ES); David Esteban-Campillo, Madrid (ES); Ivan Maza, Cadiz (ES); Fernando Caballero, Seville (ES)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 13/848,241

(22) Filed: Mar. 21, 2013

(65) Prior Publication Data

US 2014/0074339 A1    Mar. 13, 2014

(30) Foreign Application Priority Data

Mar. 30, 2012  (EP) .................................... 12382125

(51) Int. Cl.
*G05D 1/00*   (2006.01)
*G05D 1/10*   (2006.01)

(52) U.S. Cl.
CPC ............. *G05D 1/00* (2013.01); *G05D 1/0088* (2013.01); *G05D 1/104* (2013.01)
USPC .......................................... 701/24; 718/104

(58) Field of Classification Search
None
See application file for complete search history.

(56) References Cited

U.S. PATENT DOCUMENTS

| | | | |
|---|---|---|---|
| 6,122,572 A | 9/2000 | Yavnai | |
| 6,408,226 B1 * | 6/2002 | Byrne et al. | 700/258 |
| 6,904,343 B2 * | 6/2005 | Kang | 701/23 |
| 7,266,532 B2 * | 9/2007 | Sutton et al. | 706/12 |
| 7,912,631 B2 * | 3/2011 | Howard et al. | 701/519 |
| 2007/0021880 A1 * | 1/2007 | Appleby et al. | 701/23 |
| 2009/0064169 A1 | 3/2009 | Nguyen et al. | |

OTHER PUBLICATIONS

Ryan et al.; Decentralized Control of Unmanned Aerial Vehicle Collaborative Sensing Missions; American Control Conf., 2007; ACC '07, pp. 4672-4677; Jul. 9-13, 2007.*

(Continued)

*Primary Examiner* — Michael J Zanelli
(74) *Attorney, Agent, or Firm* — Baker & Hostetler LLP

(57) ABSTRACT

The present invention provides a co-operative network of unmanned vehicles that participate in co-operative task allocation. Each unmanned vehicle comprises a computer system with an executive level configured to control motion of the unmanned vehicle and an automatic decision level configured to communicate with other unmanned vehicles, to receive task descriptions, to participate in task allocation, and to provide descriptions of tasks to be performed to the executive level for execution. Each unmanned vehicle submits a bid for each task it can perform, the bid reflecting an execution cost for the task. The bids are compared and the task effectively auctioned to the unmanned vehicle with a lowest execution cost. Each unmanned vehicle builds a task plan from its allocated tasks, decomposes the associated task descriptions into elementary task descriptions and forwards the elementary task descriptions in a format suitable for the executive level to execute.

19 Claims, 7 Drawing Sheets

(56) References Cited

OTHER PUBLICATIONS

Azevedo et al. Hierarchical Distributed Architectures for Autonomous Mobile Robots: a Case Study. IEEE Conference on Emerging Technologies and Factory Automation, 2007. ETFA. pp. 973-980. Patras, Greece, Sep. 25-28, 2007.

Badano, Bianca M. Innocenti. A multi-agent architecture with distributed coordination for an autonomous robot. PhD Thesis. Oct. 2008.

Botelho et al. M+: a scheme for multi-robot cooperation through negotiated task allocation and achievement. In Proceedings of the 1999 IEEE International Conference on Robotics & Automation, vol. 2, pp. 1234-1239, Detroit, Michigan. May 1999.

Brumitt et al. GRAMMPS: A generalized mission planner for multiple mobile robots. In Proceedings of the IEEE International Conference on Robotics and Automation, May 16-20, 1998. vol. 2, pp. 1564-1571.

Caloud et al. Indoor automation with many mobile robots. In Proceedings of the IEEE International Workshop on Intelligent Robotics and Systems (IROS), 1990. pp. 67-72.

Dias et al. Opportunistic optimization for market-based multirobot control. In Proceedings IEEE/RSJ International Conference on Intelligent Robots and Systems, pp. 2714-2720, Lausanne, Switzerland, 2002.

Dias et al. Market-based multirobot coordination: A survey and analysis. Proceedings of the IEEE, 94(7):1257-1270, Jul. 2006.

European Patent Application No. 12382125.8: Extended European Search Report dated Jul. 26, 2012, 8 pages.

Forssén. Low and Medium Level Vision using Channel Representations. PhD thesis, Linköping University, 2004. Thesis No. 858.

Gerkey et al. Murdoch: Publish/subscribe task allocation for heterogeneous agents. In Proceedings of the Fourth International Conference on Autonomous Agents, Barcelona, Spain, 2000.

Gerkey et al. Sold!: Auction methods for multi-robot coordination. IEEE Transactions on Robotics and Automation, 18(5):758-768, 2002.

Gerkey et al. A formal analysis and taxonomy of task allocation in multi-robot systems. International Journal of Robotics Research, 23(9):939-954, 2004.

Hert et al. Polygon area decomposition for multiple-robot workspace division. International Journal of Computational Geometry and Applications, 8(4):437-466, 2001.

Ko et al. A practical decision-theoretic approach to multi-robot mapping and exploration. In Proceedings IEEE/RSJ International Conference on Intelligent Robots and Systems, pp. 2714-2720, 2003.

Legras et al. Authority Sharing in a Swarm of UAVs: Simulation and Experiments with Operators. In International Conference on Simulation, Modeling, and Programming for Autonomous Robots—SIMPAR 2008, Venice, Italy, 2008.

Müller, Jean-Pierre et al. A distributed autonomous system architecture "Application to mobile robotics". IEEE International Conference on Systems, Man and Cybernetics. vol. 3, pp. 623-625. Le Touquet, France, Oct. 17-20, 1993.

Parker. Alliance: An architecture for fault-tolerant multi-robot cooperation. IEEE Transactions on Robotics and Automation, 14(2):220-240, Apr. 1998.

Parker. Distributed intelligence: Overview of the field and its application in multirobot systems. Journal of Physical Agents, 2(1):5-14, Mar. 2008.

Smith. The Contract Net Protocol: High-level communication and control in a distributed problem solver. IEEE Transactions on Computers, 29(12):1104-1113, Dec. 1980.

Sujit et al. Distributed Sequential Auctions for Multiple UAV Task Allocation. Proceedings of the 2007 American Control Conference, Marriott Marquis Hotel at Times Square, New York City, USA, Jul. 11-13, 2007, pp. 3955-3960.

Viguria et al. SET: An algorithm for distributed multirobot task allocation with dynamic negotiation based on task subsets. In Proceedings of the IEEE International Conference on Robotics and Automation, Apr. 10-14, 2007, pp. 3339-3344, Rome, Italy.

Werger et al. Broadcast of local eligibility for multi-target observation. In Distributed Autonomous Robotic Systems 4, pp. 347-356. Springer-Verlag, 2000.

* cited by examiner

NETWORK OF UNMANNED VEHICLES

CROSS REFERENCE TO RELATED APPLICATIONS

The present invention claims priority to European Application No. 12382125.8, filed Mar. 30, 2012, the contents of which are hereby incorporated by reference in their entirety.

TECHNICAL FIELD

The present invention relates to networks of autonomous unmanned vehicles, such as unmanned air vehicles. The present invention provides a novel architecture for distributed co-operation amongst the autonomous unmanned vehicles, for example during intelligence, surveillance and reconnaissance (ISR) missions.

BACKGROUND

Networks of unmanned vehicles are often used in intelligence, surveillance and reconnaissance missions. The unmanned vehicles may be air vehicles, space vehicles, ground vehicles or water vehicles, or combinations of these types. The networks may also be used in combination with manned vehicles. The unmanned vehicles are often fitted with a sensor such as a camera to allow remote surveillance of an area or a target object. Networks or swarms of unmanned vehicles may be used to provide surveillance over an extended area. The unmanned vehicles may act co-operatively to provide complete surveillance over that extended area or to provide surveillance of a number of targets of interest in that area.

For any particular mission, the mission is decomposed into a series of tasks that are assigned to the unmanned vehicles. This is typically performed by an operator located at a ground control station. The operator may then assume ongoing supervision of the unmanned vehicles while the mission is performed.

Existing networks of unmanned vehicles tend to be designed with a centralized decision-making configuration like that described above, and with minimal distributed supervision. Hence, mission planning including task allocation, coordination and supervision, ranging from simple task requests to complex requests requiring sequences of high level tasks, are driven by a central decision making facility that is usually a ground control station. Such centralized configurations pose disadvantages and creates barriers to an efficient, autonomous, cooperative mission. For example, such a centralized configuration requires powerful computational means, is not scalable, suffers from data integrity and availability issues, and results in inflexible mission management.

There is a need for decentralized configurations where decision making responsibilities are assumed by the unmanned vehicles such that decision making is effected in a distributed manner.

SUMMARY

From a first aspect, the present invention resides in an unmanned vehicle for use in a co-operative network of unmanned vehicles. The unmanned vehicles may be of a common type or may be of different types. For example, mixed types of unmanned air, land and water-borne vehicles may be used. Even within each type, different unmanned air vehicles may be used, such as different types of unmanned air vehicles. Fixed wing aircraft and/or rotorcraft may be used. Surface and/or sub-surface water vehicles may be used.

The unmanned vehicle comprises propulsive means for propelling the unmanned vehicle. The unmanned vehicle further comprises steering means for controlling the direction of motion of the unmanned vehicle. Thus the propulsive means and steering means are used to move the unmanned vehicle from place to place. The unmanned vehicle is provided with a sensor operable to sense information regarding the status of the unmanned vehicle. For example, the status may correspond to any of speed, direction, velocity, acceleration, location, altitude, attitude and fuel.

The unmanned vehicle comprises a computer system programmed to allow autonomous operation of the unmanned vehicle, and to allow co-operative allocation of tasks between a network of unmanned vehicles. The computer system comprises an executive level and an automatic decision level. The executive level is intended to interface with the controls of the unmanned vehicle, and the automatic decision level is intended to control the executive level and to communicate with other unmanned vehicles and one or more ground control stations.

The executive level is configured to send control signals to the propulsive means and the steering means thereby controlling motion of the unmanned vehicle, and to receive a status signal from the sensor thereby providing a status of the unmanned vehicle.

The automatic decision level is configured to communicate with a ground control station and with other unmanned vehicles so that it may participate in task allocation. Task allocation may or may not involve the ground control station. The automatic decision level is also configured to receive task descriptions and to decompose and format task descriptions into elementary task descriptions for forwarding to the executive level. The elementary task descriptions may correspond to elementary control commands that are provided in order to control the propulsion means and the steering means. To this end, the automatic decision level comprises a task allocation module, a task refining module and a task manager module.

The task refining module is configured to receive an unallocated task description describing a task to be undertaken by one of the unmanned vehicles of the network, to determine if its unmanned vehicle is able to perform the task and, if yes, to calculate an execution cost for the unmanned vehicle to execute that task. The execution cost may be a measure of the energy required to perform the task, a measure of how soon the task may be performed, a measure of the how well the task may be performed, or any combination of these factors.

The task allocation module is configured to participate in task allocation. The task allocation may run as an auction between the unmanned vehicles, and the task allocation module is configured to participate in the auction in one of two modes.

In a first mode, the task allocation module acts as a bidder by forwarding the execution cost for a task as a bid for that task to another unmanned vehicle that is acting as an auctioneer. If the bid is successful, the task allocation module receives a task allocation message informing the unmanned vehicle that it won the auction and so has been allocated the task.

In a second mode, the task allocation module operates as the auctioneer by receiving bids from other unmanned vehicles of the network. Each bid corresponds to the execution cost for the associated unmanned vehicle to execute the task. The task allocation module may be configured to select the bid with the lowest execution cost and to send a task allocation message to the other unmanned vehicle associated with the selected bid to inform that unmanned vehicle that it has been allocated the task.

In this way, the task allocation module participates in the task allocation and, in either mode, the end result is that the task allocation module provides a list of tasks allocated to its unmanned vehicle. The task refining module is further configured to use the list of allocated tasks provided by the task allocation module to build a task plan. This task plan comprises an ordered list of tasks allocated to the unmanned vehicle according to a planned order of execution. The task plan may or may not contain all tasks allocated to the unmanned vehicle. Some tasks may have associated pre-conditions that must be satisfied before the tasks can be executed. As such, no firm or precise ordering of all tasks may be performed. Consequently, the task refining module may provide a partially-ordered list of tasks as the task plan.

The task refining module is also configured to decompose the task descriptions associated with the allocated tasks into elementary task descriptions for the executive level. For example, a task may be to move to a location and take images of that location. The task refining module may be configured to divide this into elementary tasks suitable for the executive level, such as a motion task for the motion controls of the unmanned vehicle and camera controls for a camera of the unmanned vehicle.

The task manager module is configured to receive the elementary task descriptions, to store the elementary task descriptions and to forward the elementary task descriptions in a format suitable for the executive level to execute. Thus the task manager is responsible for the queuing of tasks and for their release to the executive level at an appropriate time for execution. For example, as mentioned above, some tasks may have pre-conditions and it is the task manager module that releases the tasks to the executive level once the pre-conditions are satisfied.

Such an unmanned vehicle allows a network of similar unmanned vehicles to be formed that may operate in an autonomous way and that may participate in co-operative task allocation. This addresses problems that arise during the execution of multi-purpose, multi-vehicle operations, such as task negotiation, decomposition and allocation and, as will be described further below, allows improved conflict resolution and sensor data fusion. The task allocation provided by the present invention relieves a human operator of the network from the burden of detailed unmanned vehicle control and relaxed communication constraints in terms of bandwidth and permanent availability result. The network maintains its flexibility in that a human operator may still allocate tasks to specific unmanned vehicles if so desired, and operate with mixed schemes where some tasks are allocated to specific unmanned vehicles and other tasks are left to be allocated by auction amongst the unmanned vehicles.

The task refining module may comprise a task refining toolbox, a plan builder and a plan merger. The task refining toolbox may be configured to provide the function described above of decomposing task descriptions associated with allocated tasks into elementary task descriptions for the executive level. The task refining toolbox may be configured to provide the elementary tasks to the plan builder. The plan builder may be configured to order the elementary tasks into the task plan described above that comprises the list of tasks ordered, or partially ordered, according to a planned order of execution. The plan builder may be configured to generate a trajectory to be flown to execute the task plan. The trajectory may be an ordered list of waypoints to be traversed. The plan merger may be configured to communicate with other unmanned vehicles of the network to ensure that the trajectory will not bring the unmanned vehicle into conflict with other unmanned vehicles. This helps avoid collisions between unmanned vehicles. The plan builder may be configured to amend the task plan if the plan merger determines that conflicts will arise, for example to dwell at a waypoint until the path to the next waypoint is clear.

The task manager module may comprise a task manager and a synchronization manager. The task manager may be configured to store elementary tasks along with associated pre-conditions to be fulfilled before task can be executed. The synchronization manager may be configured to monitor the status of any of the unmanned vehicles, the tasks allocated to its unmanned vehicle and the tasks allocated to other unmanned vehicles of the network. The synchronization manager may then determine when the pre-conditions of a task are satisfied. When the synchronization manager determines that the pre-conditions of a task have been satisfied, the task manager may be configured to forward associated elementary task descriptions to the executive level for execution.

The executive level may be configured to provide task status data and/or unmanned vehicle status data derived from the status signal. The synchronization manager may be configured to use the task status data and/or unmanned vehicle status data to determine when pre-conditions of a task are satisfied.

The task refining module may be configured to receive a pre-allocated task description describing a task specifically allocated to the unmanned vehicle in addition to tasks allocated to the unmanned vehicle through the auction. For example, the ground control station may pre-allocate some tasks and may put some tasks out to auction. The task refining module may be configured to build a task plan comprising an ordered or partially-ordered list of tasks allocated to the unmanned vehicle, including both pre-allocated tasks and tasks allocated by auction, according to a planned order of execution. The task refining module may update the task plan from time to time, for example when advised by the synchronisation manager that the pre-conditions for a task have been satisfied and so the task is available for execution.

The unmanned vehicle may be provided with a perception system. The perception system may comprise one or more surveillance sensors for gathering data. Where multiple surveillance sensors are provided, the perception system may comprise a data fusion engine to fuse data provided by the surveillance sensors.

The present invention also extends to a network of unmanned vehicles, wherein each unmanned vehicle is as described above. The unmanned vehicles may share a common design of automatic decision level, although their executive levels and/or designs of executive levels may differ according to the type of unmanned vehicle. Communication between unmanned vehicles may comprise communication between respective automatic decision levels. The automatic decision level may be modular, with different unmanned vehicles having a common core but some different modules according to the capabilities of their unmanned vehicles.

The present invention also resides in methods of operating a network of unmanned vehicles, as set out in the appended claims.

BRIEF DESCRIPTION OF THE DRAWINGS

In order that the present invention may be more readily understood, preferred embodiments will now be described, by way of example only, with reference to the accompanying drawings in which.

DETAILED DESCRIPTION OF ILLUSTRATIVE EMBODIMENTS

Figure 1:
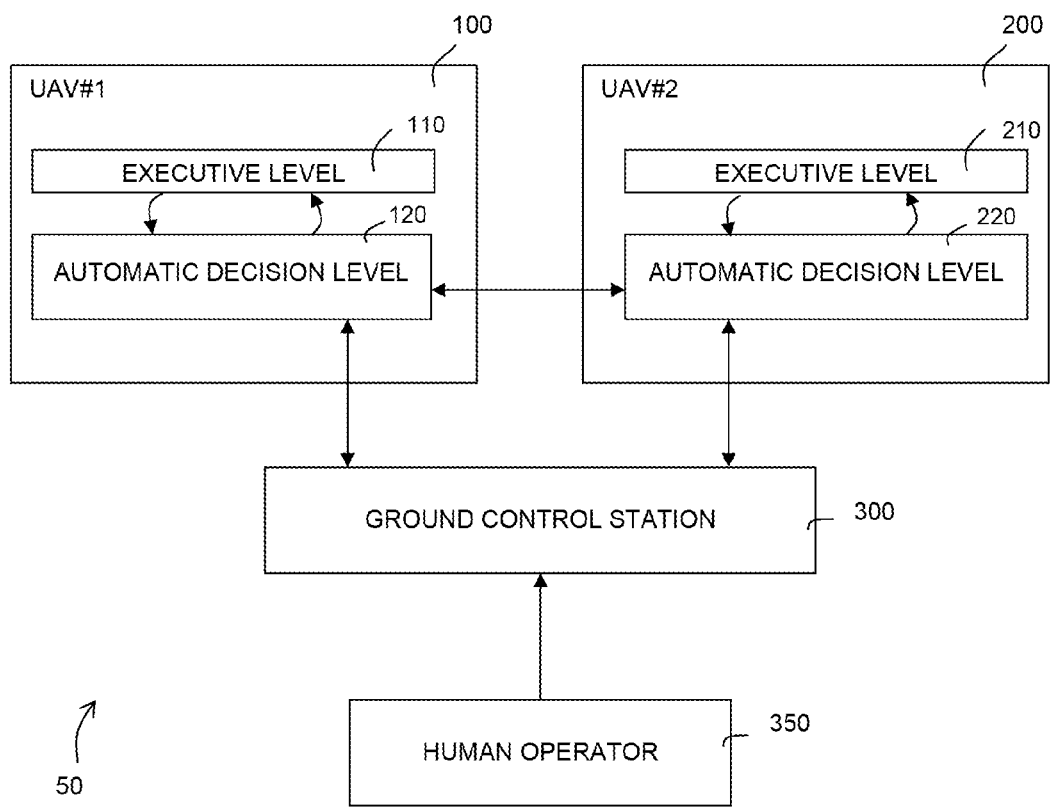
FIG. 1 is a schematic representation of a platform architecture for a network of unmanned air vehicles.

As will be appreciated from the above, the present invention has wide applicability to all types of unmanned vehicles. In the following exemplary embodiments, networks comprising unmanned air vehicles are described. Adaptation of these embodiments to networks comprising other types and/or mixed types of unmanned vehicles will be straightforward to those skilled in the art.

In the following embodiments, missions relating to intelligence, surveillance and reconnaissance (ISR) are considered by way of example only. It will be appreciated that the present invention extends to other mission types. Particular ISR applications that will benefit from the present invention include border control, military reconnaissance missions and critical infrastructure protection.

While the present invention advantageously provides distributed decision making amongst the unmanned air vehicles, the present invention provides inherent flexibility such that different modes of decision making may be used. In order to preserve generality, to allow future developments, and to allow simple pre-defined missions to be performed, the planning and control architecture described herein is arranged to allow various scenarios ranging from planning and decision-making activity entirely performed at a centralized control station off-line, to distributed decision-making autonomy at the different platform components level with direct co-operation amongst the platforms (unmanned air vehicles). Typical scenarios could include the following.

As a first example, a mission planning scenario could be a centralized ground control station producing off-line, and before the mission is executed, a detailed set of tasks or actions that can be directly executed by each unmanned air vehicle. These tasks may then be provided directly to each unmanned air vehicle allocated with any particular task.

As a second example, a mission planning and control scenario could allow a human operator to produce a detailed set of tasks or actions off-line, and to add or amend the tasks on-line in response to data gathered by the unmanned air vehicles. Such data will be gathered and processed by the perception system provided by the unmanned air vehicles. For example, some or all the unmanned air vehicles may be provided with optical and infrared cameras that feed a data fusion component of a perception system of the unmanned air vehicle. The perception system may use the images captured by the cameras to identify a target and may report the results of its interpretation to the human machine interface software at the centralized ground control station. The operator may then amend the tasks assigned to that or another unmanned air vehicle in response, for example by sending another unmanned air vehicle to the target location to provide further surveillance.

As a third example, a scenario could involve high level planning by the human operator at the centralized control station, followed by autonomous context-dependent task refinement at the platform components level. A list of tasks of actions may be provided by the human operator that is sent to the unmanned air vehicles, and the unmanned air vehicles determine how the tasks are allocated between them. The human operator may send further tasks during mission execution. Such autonomy may involve the unmanned air vehicle performing situation assessment based on its perception system.

Combinations of the above examples may also be used. For example, a human operator may define a mission having some tasks that are assigned to specific unmanned air vehicles and some tasks that are unassigned and are to be allocated co-operatively by the unmanned air vehicles. Once a mission starts, the human operator may initiate further tasks to be performed and these tasks may be pre-allocated to a specific unmanned air vehicle or may be sent to be allocated by auction.

The present invention provides a distributed architecture that allows autonomous coordination and co-operation of multiple unmanned aerial vehicles. To provide this functionality, the unmanned air vehicles are provided with different modules that solve problems arising during the execution of missions, such as task allocation, task ordering and conflict resolution (to ensure safe separation of unmanned air vehicles as they move around).

The architectures described herein are partially derived from two requirements of allowing easy integration of different unmanned air vehicles and providing robustness for the operation in border surveillance scenarios.

To assist easy integration of different types of unmanned air vehicles, a limited requirement for the execution capabilities of the unmanned air vehicles is made. That is, each unmanned air vehicle is required merely to be able to move to a given location (such as a waypoint, for example by following a series of waypoints) and to activate one of their onboard instruments when commanded to do so. Such a small number of basic requirements ensures easy integration of unmanned air vehicles from different manufacturers. It also allows ease of integration of other unmanned vehicle types, such as ground vehicles and/or waterborne vehicles.

To ensure robustness during operation, a distributed architecture is adopted that allows an intentional co-operative approach. In this architecture, each individual unmanned air vehicle executes a set of tasks it has been allocated. Each task may correspond to a sub-goal, where the set of sub-goals are necessary to achieve the overall goal of the mission, and where each sub-goal can be completed independently of other sub-goals. Allocation of these tasks advantageously ensures a given mission is performed in an efficient manner according to planning strategies. This approach fits well with the heterogeneity of the system and the specifications of the missions, but also has the limitation of independent sub-goals. To ensure efficient ordering of the tasks to be completed, additional explicit knowledge may be provided by defining state dependencies in pre-conditions associated with each task or one of its allocated tasks. For example, a task may have associated pre-conditions such that the task will not execute until the pre-conditions are met. For example, a pre-condition may be delaying execution until an earlier task has been completed. The use of pre-conditions is explained in greater detail below.

To allow ease of integration of different types of unmanned air vehicles, an architecture like that shown in FIG. 1 may be adopted. FIG. 1 is a simplified schematic representation of a network 50 of unmanned air vehicles 100, 200 under the control of a centralized ground control station 300. Only two unmanned air vehicles 100 and 200 are shown, although the network 50 may comprise any number of unmanned air vehicles 100, 200. As noted above, other types of unmanned vehicles and manned vehicles may also form part of the network 50. The unmanned air vehicles 100, 200 may be of a common type or may be of different types. The unmanned air vehicles 100, 200 may be fixed wing aircraft or may be rotorcraft. The unmanned air vehicles 100, 200 may be provided with the same or different sensors, for example optical and/or infra-red cameras.

The ground control station 300 provides facilities for the control of the network 50 by a human operator 350. For example, the ground control station 300 provides a computer infrastructure including a graphical user interface to allow the human operator 350 to interact with the network 50. The ground control station 300 also provides communication means to allow bi-directional communication with the unmanned air vehicles 100, 200. As computer infrastructures and communication means are well known in the art, their basic functionality will not be described further.

The architecture of each unmanned air vehicle 100, 200 comprises two levels, a proprietary executive level 110, 210 and an automatic decision level 120, 220. The automatic decision level 120, 220 in each unmanned air vehicle 100, 200 is advantageously of a common design. That is, the core modules of the automatic decision level 120, 220 are common. Some modules of the automatic decision level 120, 220 may vary, for example those that interface with the executive level 110, 210. Essentially, this allows "translator" modules to be included to ensure the basic outputs of the automatic decision level 120, 220 may be formatted into a form that may be understood by the executive level 110, 210 that may vary according to the type of unmanned air vehicle 100, 200. This core commonality allows ease of implementation across a range of unmanned air vehicles 100, 200.

As noted above, the automatic decision level 120, 220 may include translator functionality to allow standard task descriptions to be translated into a format required by the proprietary executive level 110, 210 and also to translate information received from the executive level 110, 210 into a standard format for use within the automatic decision levels 120, 220 of any of the unmanned air vehicles 100, 200.

To allow distributed decision-making, the unmanned air vehicles 100, 200 communicate with each other via their automatic decision levels 120, 220. Also, the automatic decision levels 120, 220 of the unmanned air vehicles 100, 200 communicate with the ground control station 300.

Figure 2:
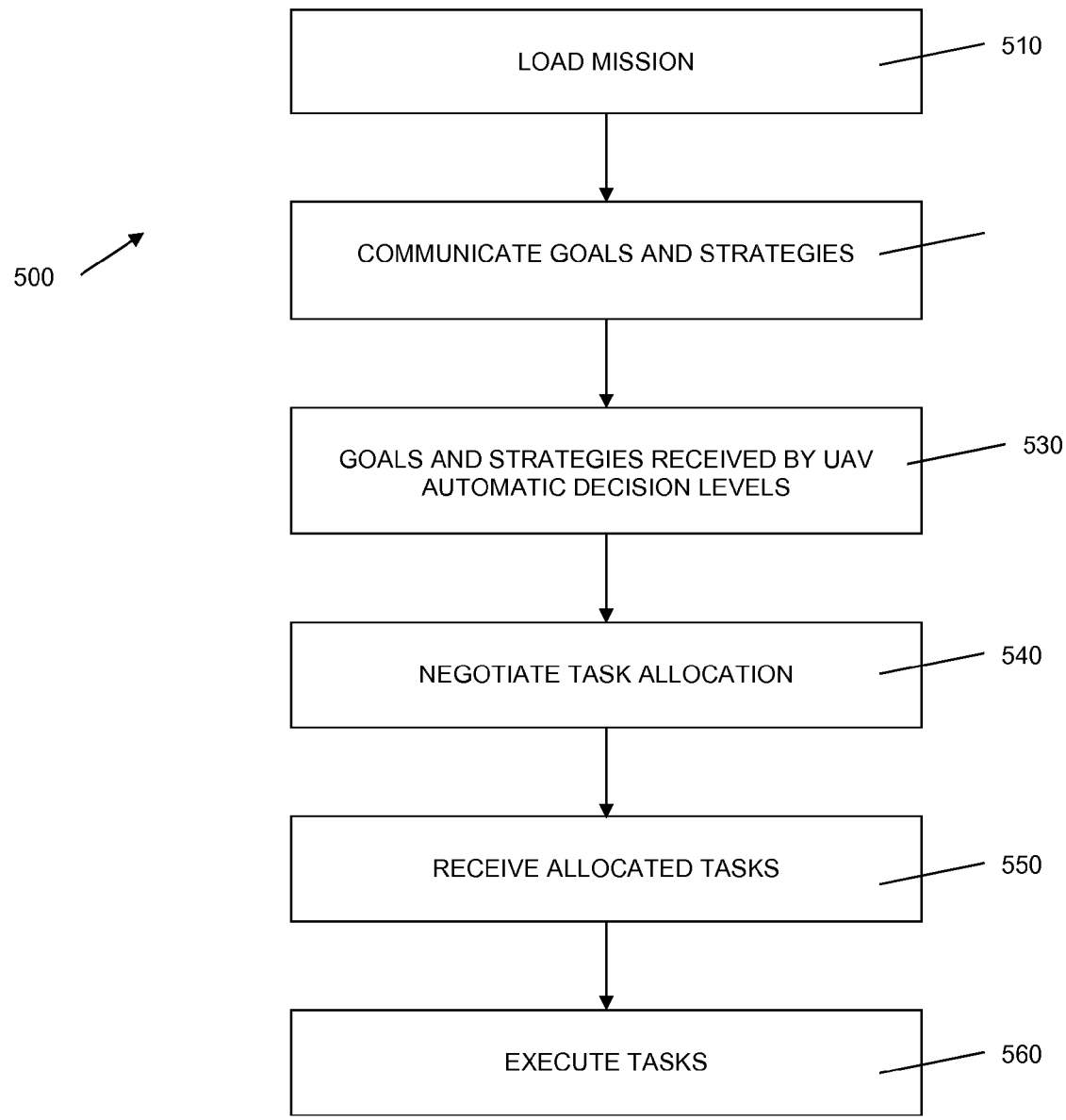
FIG. 2 is a schematic representation of a method of using a network of unmanned air vehicles to perform a surveillance mission.

FIG. 2 shows a method 500 of using a network 50 of unmanned air vehicles 100, 200 to perform a surveillance mission.

As shown at 510, the method 500 starts when the global definition of a mission is loaded into the ground control station 300 by the human operator 350. In this example, the mission is represented by a set of global goals (e.g. perimeter surveillance) to be achieved and a high level description of the strategy to accomplish it (e.g. visual or infrared area visualization). At this stage, the human operator 350 does not mind how the network 50 executes the mission neither how the individual tasks required to achieve the overall mission are distributed among the unmanned air vehicles 100, 200.

At 520, the ground control station 300 communicates the goals and strategies established to all the unmanned air vehicles 100, 200. The goals and strategies are received by the automatic decision levels 120, 220 of the unmanned air vehicles, as indicated at 530.

At 540, the automatic decision levels 120, 220 of the unmanned air vehicles 100, 200 negotiate with each other to arrive at an allocation of tasks amongst the unmanned air vehicles 100, 200. Each automatic decision level 120, 220 may establish which tasks its parent unmanned air vehicle 100, 200 is capable of performing. During the negotiation process 540, each unmanned air vehicle 100, 200 shares information regarding the tasks it can execute and other information about how these tasks meet the mission strategies established by the human operator 350. For example, if speed is a strong requirement, each unmanned air vehicle 100, 200 will share its expected completion time for executing the tasks so that the network 50 may rate all the alternatives and select the unmanned air vehicle 100, 200 that can complete the task soonest. Once all possible solutions have been shared and rated, the optimum solution is selected in a co-operative manner, and finally each task is allocated to the selected unmanned air vehicle 100, 200 as shown at 550.

The automatic decision level 120, 220 of each unmanned air vehicle 100, 200, after receiving the list of tasks it has been allocated, executes the allocated tasks as indicated at 560. This is achieved by the automatic decision level 120, 220 decomposing the tasks into elementary tasks that are communicated to the executive level 110, 210 of the unmanned air vehicle 100, 200. The executive level 110, 210 is the interface between the automatic decision level 120, 220 and the native flight control system (FCS) of the unmanned air vehicle 100, 200 and other proprietary controls that operate sensors on the unmanned air vehicle 100, 200. Each elementary task received by the executive level 110, 210 is translated into a sequence of command and control instructions to the steering and propulsive systems of the unmanned air vehicle 100, 200 and to the sensors to guide the unmanned air vehicle 100, 200 through the prioritized list of tasks.

Figure 3:
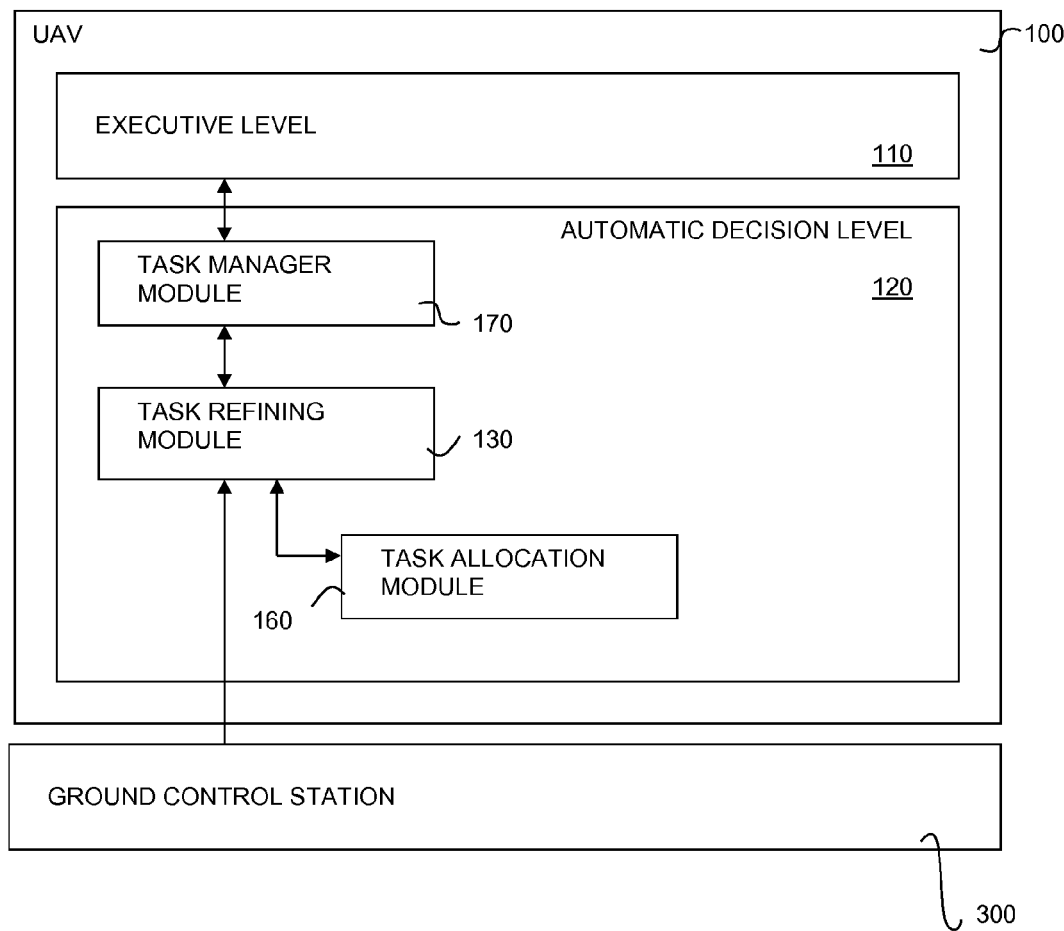
FIG. 3 is a schematic representation of an architecture implemented for one of the unmanned air vehicles of FIG. 1.

FIG. 3 shoes schematically the interaction between the ground control station 300 and one of the unmanned air vehicles 100, as well as the arrangement of components within the unmanned air vehicle 100. The choice of unmanned air vehicle 100 is arbitrary, such that other unmanned air vehicles 200 are of corresponding design.

In particular, the automatic decision level 120 is shown in more detail and can be seen to comprise three modules: a task refining module 130, a task allocation module 160 and a task manager module 170. These three modules 130, 160 and 170 support the distributed decision-making process.

The task refining module 130 receives mission and task descriptions from the ground control station 300, e.g. the definition of mission goals and strategies described above. To avoid undue repetition, the term task descriptions will be used hereinafter to describe both task descriptions and mission descriptions, as mission descriptions are essentially a set of task descriptions.

Where necessary, the task refining module 130 decomposes the task descriptions such that the task refining module 130 may identify those tasks that its unmanned air vehicle 100 is capable of performing. Once the tasks that the unmanned air vehicle 100 is capable of performing have been identified, the task refining module 130 calculates an execution cost for the unmanned air vehicle 100 to perform each possible task. This execution cost may be a normalized scalar magnitude that represents primarily the energy required for the unmanned air vehicle 100 to execute that task. The execution costs may also reflect how soon the task may be performed and also the quality at which it may be performed (e.g. to reflect a zoom and resolution capability of a camera).

The task allocation module 160 uses the list of tasks that the unmanned air vehicle 100 may perform and the associated execution costs when negotiating task allocation with the other unmanned air vehicles 200. As will be described in more detail below, the negotiation is effectively an auction in which each unmanned air vehicle 100, 200 may bid for each task it may perform with a bid reflecting the associated execution cost. The successful bid is usually the lowest execution cost and the task will be allocated to the unmanned air vehicle 100, 200 making the successful bid. Notification of a successful bid is received by the task allocation module 160 that passes this information to the task refining module 130.

The task refining module 130 builds a task plan that includes all the tasks allocated to the unmanned air vehicle 100. This is a dynamic process that sees the task plan updated as tasks are completed and as new tasks are received. The human operator 350 may add new tasks at any time. These tasks may be pre-allocated to a specific unmanned air vehicle 100, 200 or may be sent for co-operative allocation using the negotiation process described above.

The task refining module 130 thus provides an ordered task plan that contains all the tasks allocated to the unmanned air vehicle 100. The task refining module 130 also decomposes the tasks into elementary tasks that are better suited for use by the executive level 110. The task list may be a list of these elementary tasks, presented as elementary task descriptions.

The task refining module 130 also ensures conflicts with other unmanned air vehicles 200 are avoided, as will be described in more detail below.

The task list generated by the task refining module 130 is provided to the task manager module 170. The task manager module 170 is responsible for the execution of the tasks in the task list. The task manager module 170 ensures the synchronization of the tasks performed both by its unmanned air vehicle 100 and the other unmanned air vehicles 200. This may include ensuring that pre-conditions are met so that a task may be executed. For example, the task manager module 170 monitors for changes in the state of tasks to determine when tasks may be forwarded either direct to the executive level 110 for execution or to the task refining module 130 for adding to the task plan for later execution according to the order of the task plan. The task manager module 170 interfaces with the executive level 110 to receive status information from the executive level 110 regarding task status and unmanned air vehicle status, and also to provide elementary task descriptions to the executive level 110 when ready for execution. Thus, the task manager module 170 manages the information flow with the executive level 110 to ensure that the tasks are performed in an appropriate order as governed by the task plan.

A method of performing a mission will now be explained in greater detail, with reference to FIGS. 4 to 7. First details of task descriptions that may be used are presented.

In this embodiment, the human operator 350 defines a mission M that is provided to the ground control station 300. The definition of the mission M is decomposed (autonomously or manually) into a set T of partially ordered tasks T. This decomposition may be performed at the ground control station 300 or it may be performed by the unmanned air vehicles 100, 200. The decomposition method may be decided by the human operator 350 in the mission specification phase depending on particular skills available or on the available time before the mission must start.

Each task τ may be defined by a unique identifier k and by its type λ. Examples of types of tasks (λ) are given below.

| | |
|---|---|
| TAKE-OFF | The unmanned air vehicle 100, 200 takes off, stabilizes at a default safe altitude, then switches to a safe mode and waits for further instructions. |
| LAND | The unmanned air vehicle 100 200 starts landing procedures, lands, and is then set to a ground safe mode. |
| GOTO | The unmanned air vehicle 100, 200 moves from its current location to a point P. |
| GOTOLIST | The unmanned air vehicle 100, 200 goes in order from its current location to each of a series of waypoints, for example as provided in a task plan. |
| SURVEILLANCE | The unmanned air vehicle 100, 200 covers a given area defined by a polygon at a certain altitude. |
| GET-LOC-INFO | The unmanned air vehicle 100, 200 goes from its current location to a point P and takes images of a given location L. P is computed to have L in the centre of the on-board camera's field of view. |
| GET-OBJ-INFO | The perception system of the unmanned air vehicle 100, 200 starts to provide (if possible) estimates of the location of a given object (a car, a person, etc.). The unmanned air vehicle 100, 200 moves to an estimated location that allows that estimate to be improved. |
| WAIT | The unmanned air vehicle 100, 200 is set to a safe waiting mode, either a hover or a holding pattern, during a given period. |
| HOME | The unmanned air vehicle 100, 200 returns to the home location. |

Where a task has been allocated, either by pre-allocation at the ground control station 300 or by auction amongst the unmanned air vehicles 100, 200, the task may also be identified as being allocated to the $i^{th}$ unmanned air vehicle 100, 200 as $\tau_i^k = (\lambda, {}^-\Omega, \Omega^+, \epsilon, \Pi)$, where ${}^-\Omega$ and $\Omega^+$ are the set of pre-conditions and post-conditions associated with the task, $\epsilon$ is the status associated with the task evolution, and $\Pi$ is the set of m parameters that characterizes the task with $\Pi = \{\Pi^1, \Pi^2, \ldots, \Pi^m\}$. Examples of types of status ($\epsilon$) are given below.

| | |
|---|---|
| EMPTY | No allocated tasks. |
| SCHEDULED | The task is queued awaiting execution. |
| RUNNING | The task is in execution. |
| CHECKING | The task is being checked against inconsistencies and static obstacles. |
| MERGING | The task is in the plan merging process to avoid conflicts with other unmanned air vehicles' trajectories. |
| ABORTING | The task is being aborted. If the task is finally aborted, the status will change to ABORTED, otherwise the status will return to RUNNING. |
| ABORTED | The task has been aborted (the human operator has aborted it or the unmanned air vehicle 100, 200 was not able to accomplish the task properly). |
| ENDED | The task has been accomplished properly. |

As described above, the task refining module 130 processes the tasks received and generates simpler tasks called elementary tasks that are finally sent to the executive level 110, 210 for execution without further processing. An elementary task may be described with a unique identifier k and type $\hat{\lambda}$ and when allocated to the $i^{th}$ unmanned air vehicle 100, 200, the elementary task may be defined as $\hat{\tau}_i^k = (\hat{\lambda}, \hat{\Pi}, \hat{\epsilon})$ where $\hat{\Pi} = \{\hat{\Pi}^1, \hat{\Pi}^2, \ldots, \hat{\Pi}^{\hat{m}}\}$ is the set of $\hat{m}$ parameters that characterizes the elementary task and $\hat{\epsilon}$ is the status of elementary task evolution. In this embodiment, the only states considered for the elementary tasks are RUNNING and ENDED, thereby decreasing the required complexity of the executive level 110, 210.

The unmanned air vehicles 100, 200 to be integrated into the network 50 should be able to receive elementary tasks, execute them and report their associated execution states. A small set of elementary tasks are used to allow the integration of a broader number of unmanned air vehicles 100, 200 from different manufacturers. These unmanned air vehicles 100, 200 should be able to move to a given location and activate their on-board sensors when commanded to do so by elementary tasks. Additionally, the unmanned air vehicles 100, 200 should be capable of autonomous take-off and landing. Thus the elementary tasks used in this embodiment are a subset corresponding to the first three types of tasks listed above (i.e. TAKE-OFF, LAND, GOTO).

Figure 4:
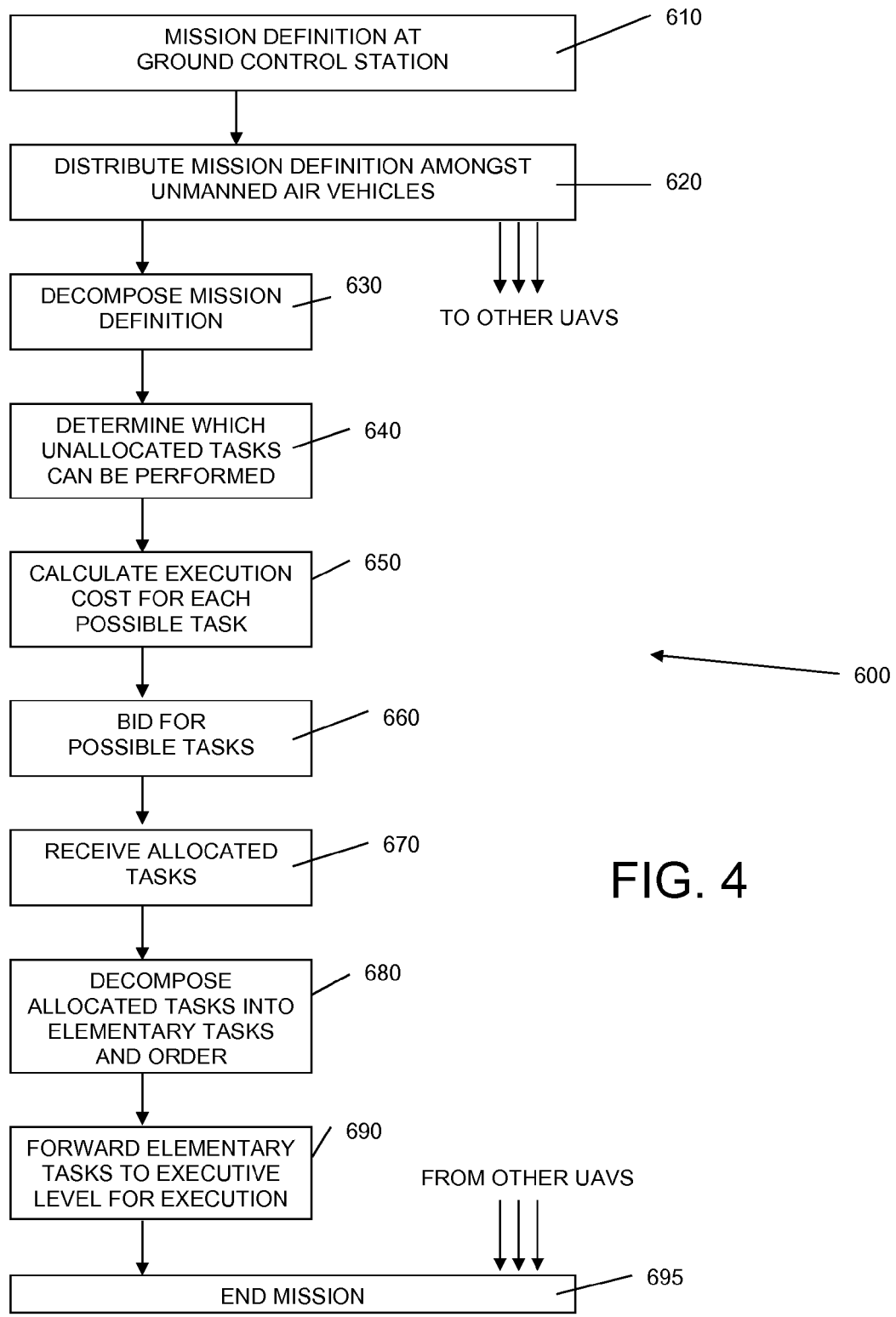
FIG. 4 is a more detailed schematic representation of the method of FIG. 2.

Turning now to FIG. 4, a method 600 of performing a mission is shown. This method 600 is essentially an extension of the method 500 described with respect to FIG. 2. The mission starts at 610 where the human operator 350 at the ground control station 300 defines the mission, for example using the method described above.

With the mission defined, the mission definition is then distributed amongst the unmanned air vehicles 100, 200 as shown at 620. Four arrows lead from step 620 in FIG. 4 to illustrate the mission definition being provided to four unmanned air vehicles 100, 200, although the network 50 may contain any number of unmanned air vehicles 100, 200. As the unmanned air vehicles 100, 200 all operate in the same manner, subsequent method steps 630 to 690 are shown for only one of the unmanned air vehicles 100.

The task refining module 130 of the unmanned air vehicle 100 receives the mission definition. The task refining module 130 can be seen in greater detail in FIG. 6. As can be seen, the mission definition 301 provided by the ground control station 300 is received by a plan builder 132. The plan builder 132 also receives specific task requests 303 from the ground control station 300, and provides task status information 131 to the ground control station 300.

The plan builder 132 passes the mission definition 301 to a task refining toolbox 134. The task refining toolbox 134 contains several tools, including mission and task decomposition services, execution cost estimators and static obstacle avoidance engines. The task refining toolbox 134 can interact with the on-board perception system 136 to retrieve information about the environment.

The task refining toolbox 134 decomposes the mission definition 301 into a series of tasks to be performed, as shown at 630 in FIG. 4. The task refining toolbox 134 looks for any tasks that have been already allocated, for example due to pre-allocation by the human operator 350. Any tasks that are allocated to the unmanned air vehicle 100 are returned to the plan builder 132, and any tasks allocated to other unmanned air vehicles 200 are noted. The tool refining toolbox 134 then determines which of the unallocated tasks its unmanned air vehicle 100 is capable of performing, as indicated at 640. This list of possible unallocated tasks is then augmented by the task refining toolbox 134 by adding an execution cost for each possible unallocated task. The task refining toolbox 134 may calculate the execution cost, as shown at 650, as follows.

The task refining toolbox 134 may calculate the execution cost of a task as the marginal cost (i.e. the change in cost) of inserting the task in its local task plan 133. The task refining toolbox 134 calls on the plan builder 132 to compute the optimum insertion point of the new task into its current local task plan 133. If the $i^{th}$ unmanned air vehicle 100 has a local plan $P_i$ (generated by the plan builder 132) with an overall cost $C_i$, with the local plan $C_i$ consisting of a set of n ordered motion tasks, then the cost of inserting a new task $\tau$ into the plan $P_i$ may be calculated by the task refining toolbox 134. To insert the task $\tau$ at the $j^{th}$ position in plan $P_i$, then a new plan $P_i(\tau^j)$ will result that has a cost $C_i(\tau^j)$. The associated marginal cost $\mu_j$ is given by $\mu^j = C_i(\tau^j) - C_i$.

Once the task refining toolbox 134 has calculated all necessary marginal execution costs, the list of possible unallocated tasks including the marginal execution costs are passed to a task negotiator 162 of the task allocation module 160. The task negotiator 162 then communicates with the other unmanned air vehicles 200 to negotiate task allocation, as shown at 660 of FIG. 4. As mentioned above, task negotiation is essentially an auction with the task negotiator 162 sending and receiving negotiation messages 163. Each bid corresponds to the marginal execution cost calculated for a possible unallocated task. The task negotiator 162 sends bids for each possible unallocated task, as shown at 660.

In terms of the autonomous co-ordination of the unmanned air vehicles 100, 200, the task allocation may be solved using different approaches. Centralized, distributed and hybrid approaches are all possible. In this embodiment, a largely distributed approach is used, namely a market-based approach that offers a good compromise between communication requirements and the quality of the solution. This approach can be considered as an intermediate solution between centralized and completely distributed approaches since it makes decisions based on negotiation messages 163 transmitted at different times. This type of approach is more fault-tolerant than a centralized approach, and can obtain more efficient solutions than applying a completely distributed approach.

This approach has a specified goal of finding solutions that minimize a global cost defined as the sum of all the individual execution costs assuming each task to be independent. This is achieved using an auction in which the task negotiators 162 of the unmanned air vehicles 100, 200 may act as an auctioneer or a bidder. These roles are shared among the unmanned air vehicles 100, 200 and the role of auctioneer is rotated amongst the unmanned air vehicles 100, 200. When the unmanned air vehicle 100 is a bidder, outgoing negotiation messages 163 comprise bids and incoming negotiation messages 163 comprise notifications of successful bids. When the unmanned air vehicle 100 acts as the auctioneer, incoming negotiation messages 163 are bids from other unmanned air vehicles 200 and outgoing negotiation messages 163 are notifications of successful bids.

To identify which unmanned air vehicle 100, 200 is the auctioneer at any particular time, a token system is used. That is, whichever unmanned air vehicle 100, 200 holds a token acts as the auctioneer with all other unmanned air vehicles 100, 200 acting as bidders. Each auction is opened for a period of time during which all the bids received by the auctioneer are considered and rated. When the auction time has elapsed, the task is allocated, and a notification is sent to the successful bidder.

In the above scheme, the auctioneer may also bid for tasks. In alternative embodiments, the auctioneer may not bid in an auction it is hosting. Then, a first round of the auction is held in which a provisional allocation of a task is made. With this done, the auctioneer passes the token to another unmanned air vehicle 100, 200. A second stage of the auction is then held in which the auctioneer from the first round changes its role to a bidder and the unmanned air vehicle 100, 200 with the token becomes the new auctioneer. To avoid transactions that will not significantly improve the solution, the best bid collected by the new auctioneer is increased by a given percentage (usually 1%). This adjusted best bid is compared to the best bid from the first round and the task is allocated to the better bid. The unmanned air vehicles 100, 200 may request the token at any time, and if no answer is received during a pre-determined period of time, the token is assumed to be lost (due to a communication failure for instance) and a new token is generated and provided to the requesting unmanned air vehicle 100, 200.

When the initial negotiation is over, the mission execution can start but new tasks can be announced at any moment. Therefore, negotiation is dynamic in the sense that new tasks are also handled during the mission execution. For instance, if an error in the execution of a task is reported then the task is re-announced. Additionally, new tasks can also be generated to increase confidence in monitoring missions, for example if the uncertainty of the estimation is above a certain threshold. All unmanned air vehicles 100, 200 take part in the negotiation of these new tasks with the only restriction being that the current tasks in execution are not re-negotiated.

Returning to FIG. 4, step 670 indicates receipt of allocated tasks at the end of the auction process (either at the mission start or during a subsequent auction of new tasks as the mission is executing). As described above, notification of successful bids and hence allocated tasks may be received by the task negotiator 162 via negotiation messages 163. These messages are forwarded to the plan builder 132 that will co-ordinate all the allocated tasks into a sequenced task plan 133 at 680.

Figure 5:
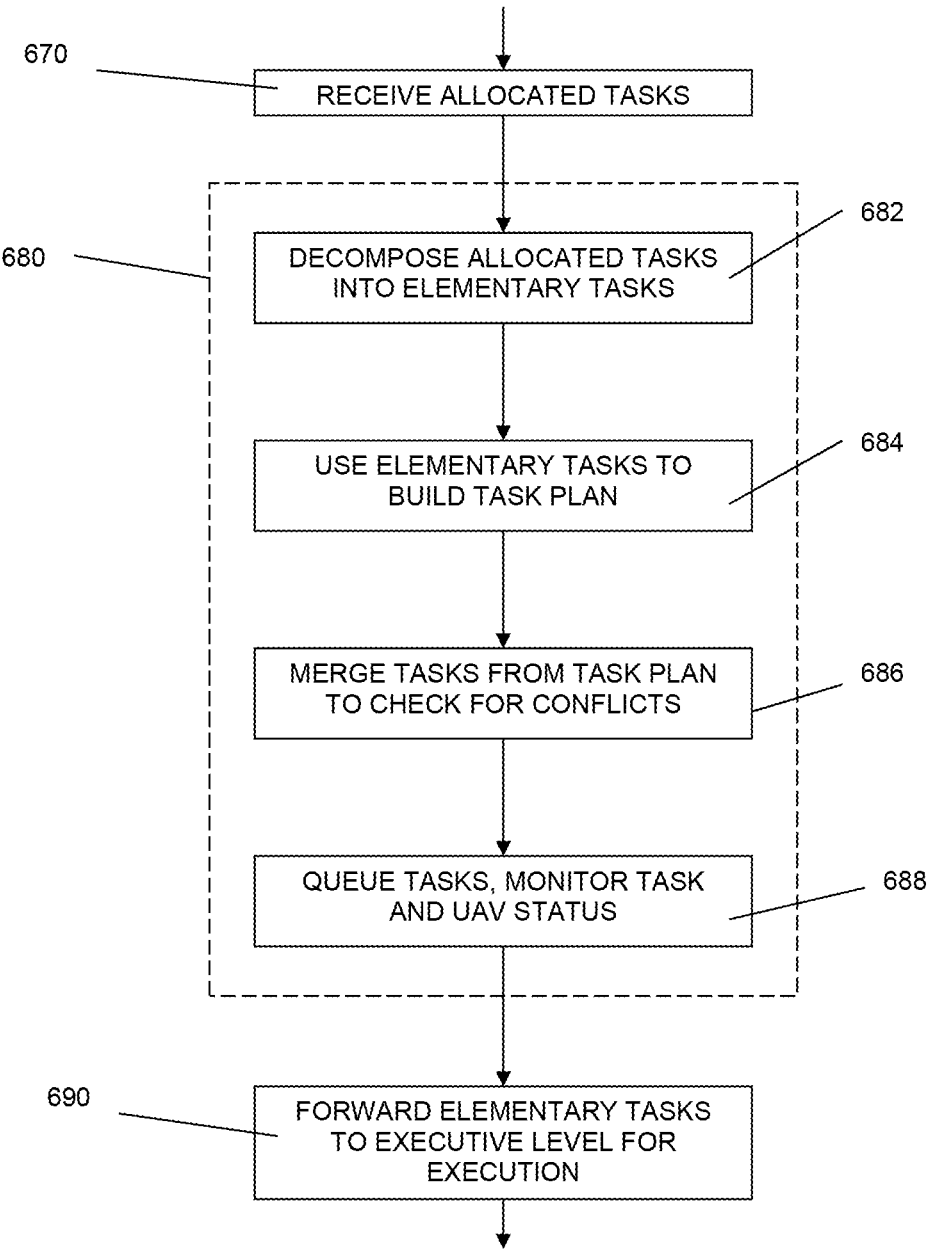
FIG. 5 shows how allocated tasks are ordered into a list of elementary tasks to be executed.
Figure 6:
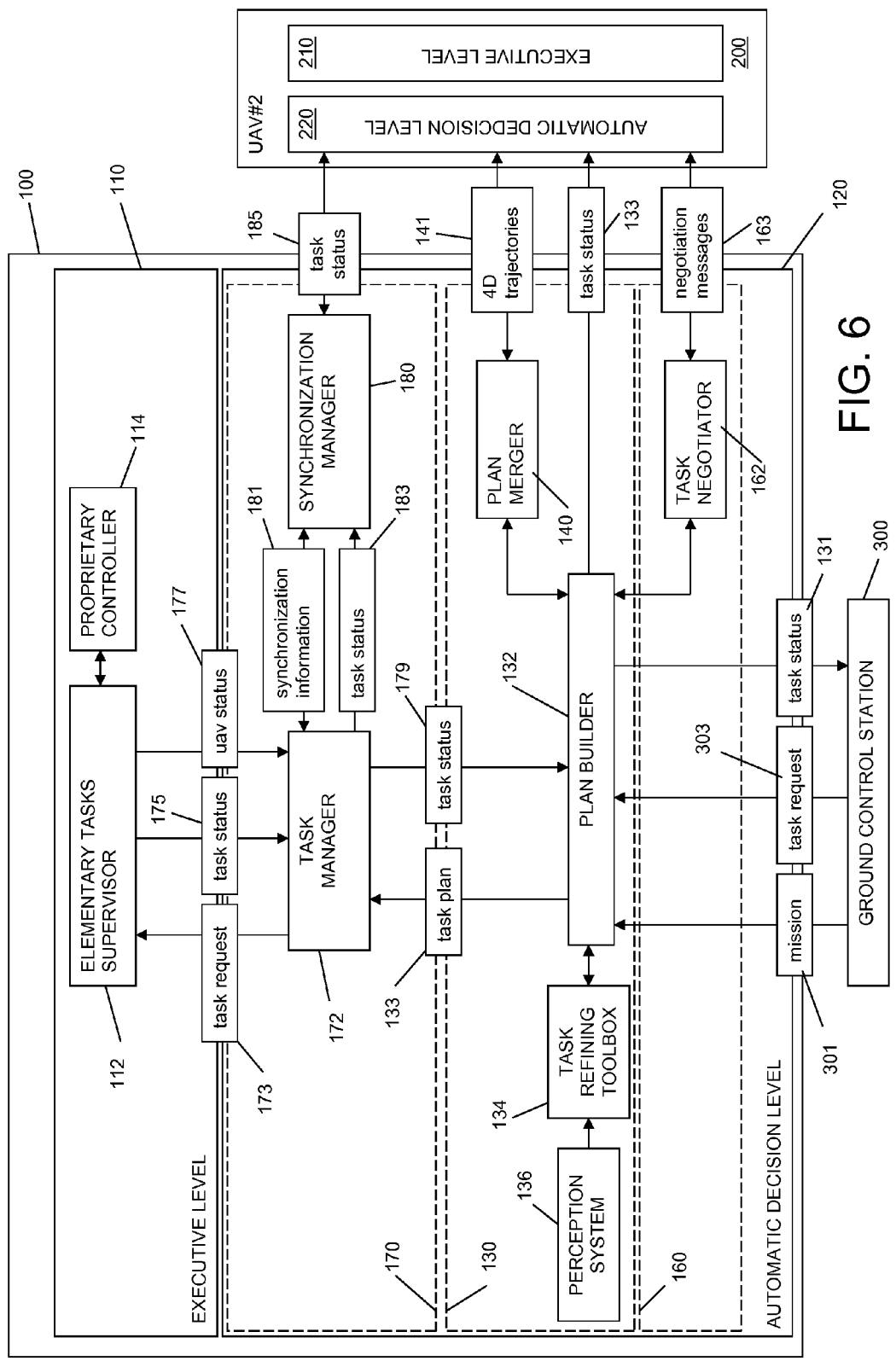
FIG. 6 is a more detailed schematic representation of the architecture shown in FIG. 3.

Step 680 is shown in more detail in FIG. 5. At 682, the plan builder 132 passes the allocated tasks to the task refining toolbox 134 where each allocated task is decomposed into one or more elementary tasks to be performed. Using the notation introduced above, the task refining toolbox 134 decomposes a task $\tau_i^k$ into $N_e$ elementary tasks $\tau_i^k \rightarrow \{^1\hat{\tau}_i^k, ^2\hat{\tau}_i^k, \ldots, ^{N_e}\hat{\tau}_i^k\}$.

Then, at step 684, the plan builder 132 takes the elementary tasks provided by the tool refining toolbox 134 and orders them into a task plan 133, as will now be described.

Tasks with unfulfilled pre-conditions are either excluded from the task plan 133 or only provisionally ordered as the pre-conditions must be met before the associated task may be executed. With the remaining tasks, the plan builder 132 places them into a firm order that minimizes the overall execution cost of the tasks. The plan builder 132 generates partial plans P by ordering the groups of motion tasks, that is tasks that require the unmanned air vehicle 100 to move from one waypoint to another. The plan builder 132 may also group elementary tasks by location, that is, to group all task requiring the unmanned air vehicle 100 to be in one location. Hence, the task plan 133 is used to schedule waypoint traversal of the unmanned air vehicle 100 in as efficient a way as possible. The task plan 133 is frequently updated, for example as new tasks become available for execution once their pre-conditions are satisfied and as new tasks are allocated to the unmanned air vehicle 100. An example of how the task plan 133 may be ordered follows.

Consider the $i^{th}$ unmanned air vehicle with a set of $n_m$ motion tasks to be executed. At 684, the plan builder 132 computes the order of the tasks $\{\tau_i^k | k=1, 2, \ldots, n_m\}$ that minimizes the execution cost $C_i$ where $$C_i = \sum_{k=1}^{n_m-1} c_i^{k,k+1}$$

and $c_i^{k,k+1}$ is the motion cost to travel between the locations associated with tasks $\tau_i^k$ and $\tau_i^{k+1}$.

This problem is an instance of the travelling salesmen problem, which is NP-hard. The simplest exact algorithm to solve it is based on a brute force search that tries all the possible ordered combinations of elementary tasks. The running time for this approach lies within a polynomial factor of $O((n_m-1)!)$, so this solution is only feasible when a small number of elementary tasks are allocated to the unmanned air vehicle 100. This is likely to be the case in most missions. However, if the human operator 350 delegates the allocation process to the unmanned air vehicles 100, 200, the plan builder 132 of each unmanned air vehicle 100, 200 may have to run the plan building algorithm many times during the negotiation with other unmanned air vehicles 100, 200. In this case, another algorithm with a lower computational cost may be used. Each time a new task is received, the plan builder 132 checks the insertion of the new task in all the possible and feasible locations in the current task plan 133 and selects the insertion point with lowest marginal cost for the task plan 133.

As described above, step 684 sees the unmanned air vehicle 100 produce a task plan 133. Next, at 686, the unmanned air vehicle's task plan 133 is compared to the task plans 133 of other unmanned air vehicles 200. This merging of task plans 133 ensures that conflicts do not arise between unmanned air vehicles 100, 200 as they move around. To effect this, the task plan 133 generated by the plan builder 132 is provided to the plan merger 140. The plan merger 140 generates a four-dimensional description of the trajectory that will be flown by the unmanned air vehicle 100 when following the task plan 133. This trajectory 141 is communicated to the other unmanned air vehicles 200, and the plan merger 140 receives trajectories 141 from the other unmanned air vehicles 200.

The plan merger 140 of unmanned air vehicle 100 detects potential conflicts among the trajectories 141 so that revisions in task plans 133 may be made to avoid conflicts. Advantageously, few requirements have been imposed on the proprietary vehicles to be integrated in the network 50. Thus, a detailed specification of the particular trajectory or velocity profile during the flight need not be considered, and conflict avoidance may be based on the set of elementary tasks provided in the task plan 133. From the executive level perspective, the task plan 133 can be viewed as a list of waypoints to be visited. An example of how step 686 may be implemented follows.

Consider n unmanned air vehicles 100, 200 in the network 50 with an initial state that is free of conflicts. For spatial conflict detection purposes, only the motion tasks in the individual task plan 133 of each unmanned air vehicle 100, 200 will be considered. The hovering capability of any rotorcraft unmanned air vehicles 100, 200 in the network 50 is exploited to simplify any conflict resolution, as far as the only motions that should be checked against conflicts are the transitions between waypoints. For fixed wing aircraft, their circulatory motion that keeps them at a waypoint may also have to be considered. A set of two states $S_i = \{s_i^1, s_i^2\}$ is considered taking into account the motion of the $i^{th}$ unmanned air vehicle 100. For example, state $s_1$ may correspond to stationary flight around a waypoint P. The unmanned air vehicle 100 can be either waiting for a new motion task or waiting until the path to the next waypoint is clear. State $s_2$ may correspond to flying between waypoints $P^k$ and $P^{k+1}$. The straight path $\Delta_i^k$ between those waypoints is considered as the reference trajectory for the $i^{th}$ unmanned air vehicle 100.

Hence, conflicts can arise only in the transitions from states $s_i^1$ to $s_i^2$. The $i^{th}$ unmanned air vehicle 100 has to check two types of potential conflicts with the $j^{th}$ unmanned air vehicle 200 depending on its current state $s_j$. The first type of conflict, type A, corresponds to $s_j = s_j^1$, that is the $j^{th}$ unmanned air vehicle is in stationary flight. Then, the potential conflict is between the next path $\Delta_i^k$ and the current position of the $j^{th}$ unmanned air vehicle 200. The second type, type B, corresponds to $s_j = s_j^2$, that is the $j^{th}$ unmanned air vehicle 200 is moving between waypoints according to a path $\Delta_j^l$. Then, the potential conflict is between path $\Delta_i^k$ and path $\Delta_j^l$.

Then, the conflict detection and resolution problem can be formulated as avoiding conflicts of types A and B in the transitions $s_i^1 \rightarrow s_i^2 \forall i=1, \ldots, n$. This problem is solved in a distributed fashion amongst the unmanned air vehicles 100, 200.

The basic idea of the distributed method proposed is to guarantee that when an unmanned air vehicle 100 is traversing a path between two consecutive waypoints, that route is clear of other unmanned air vehicles 200.

There are three transitions considered in the method implemented. The first type, $\chi 1$, is triggered when the current task $\tau_i^k$ changes its state to MERGING (see explanation of states above). The second type, $\chi 2$, is triggered when a request message is received from a plan merger 140 of another unmanned air vehicle 200. The third type, $\chi 3$, is triggered by a reply message received from a plan merger 140 of another unmanned air vehicle 200.

Regarding the first transition, $\chi 1$, consider a motion task $\tau T_i^k$ with an associated path $\Delta_i^k$. Initially, the status of the task is SCHEDULED and all the pre-conditions for its execution are satisfied. If the $i^{th}$ unmanned air vehicle 100 were in a non-shared airspace, $\epsilon^k$ should change from SCHEDULED to RUNNING and the execution of $\tau_i^k$ should start immediately. However, as there are other unmanned air vehicles 200 sharing the airspace, an intermediate state called MERGING is considered before starting the execution of the motion task. Once $\tau_i^k$ changes its state to MERGING, the associated path $\Delta_i^k$ is checked to determine if it is clear for the $i^{th}$ unmanned air vehicle 100. After execution of path $\Delta_i^k$, this path is clear once more and this condition is notified to the other unmanned air vehicles 200.

On the other hand, the $i^{th}$ unmanned air vehicle 100 also has to manage request and reply messages received from other unmanned air vehicles 200 (corresponding to transitions $\chi 2$ and $\chi 3$). When a request message is received from another plan merger 140, the $i^{th}$ unmanned air vehicle 100 has to check if the received trajectory 141 is in conflict with its trajectory. If a reply is received from another plan merger 140, a counter of positive replies is incremented. The algorithms that manage the transitions $\chi 1, \chi 2$ and $\chi 3$ run asynchronously.

In order to check if path $\Delta_j^l$ is in conflict with a path requested by the $i^{th}$ unmanned air vehicle 100 or if path $\Delta_j^l$ is in conflict with the $i^{th}$ unmanned air vehicle's current location, the following bounding solid has been considered for simplicity: a box of edge length $2r_i$ centred at the GPS antenna location of the $i^{th}$ unmanned air vehicle 100. The safety radius $r_i$ around the $i^{th}$ unmanned air vehicle 100 may be set taking into account different factors such as the aero-dynamical perturbation generated around the unmanned air vehicle 100, the maximum distance between the GPS antenna and any point of the unmanned air vehicle 100, and the maximum separation $s_i$ with respect to the reference trajectory according to the unmanned air vehicle dynamics, control law and maximum wind perturbations under operational conditions.

Figure 7:
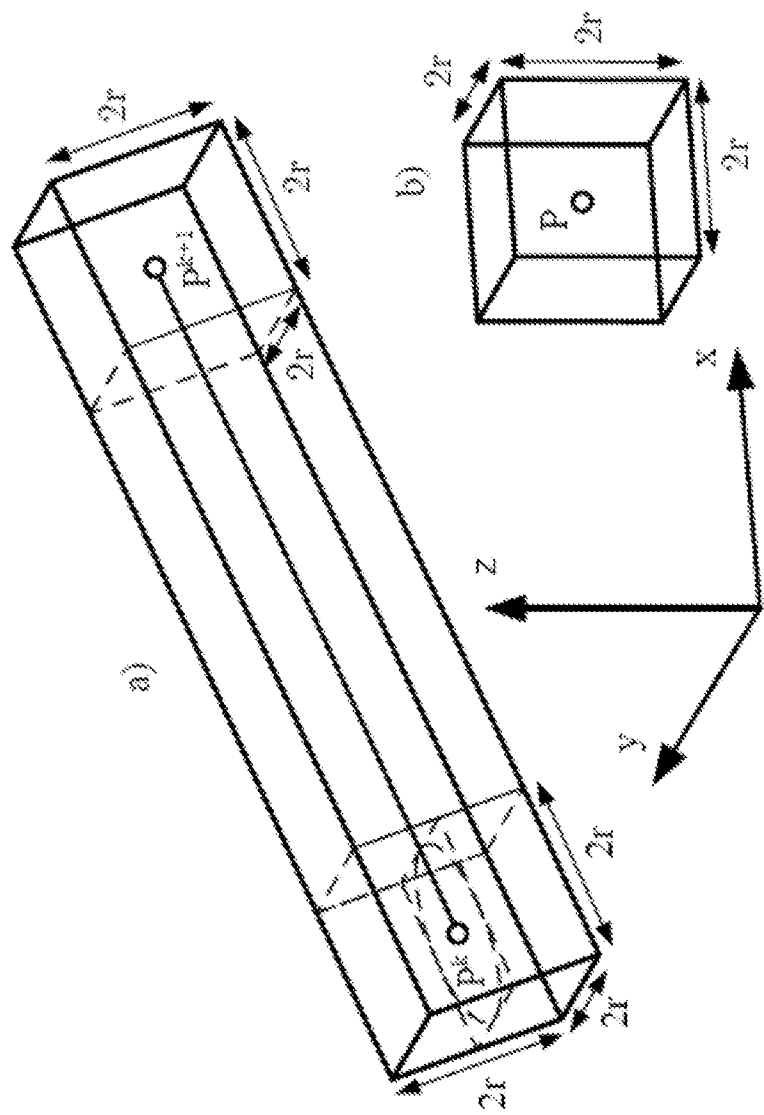
FIG. 7 is a model to show how conflict detection and resolution may be performed during task merging.

Thus according to the set of states $S_i$ and the bounding box selected, there are two types of solids involved in the potential conflict detection process: a box for each unmanned air vehicle 100, 200 in stationary flight and a rectangular hexahedron for each trajectory between waypoints $P^k$ and $P^{k+1}$, see FIG. 7. Taking into account that the chosen bounding solids are convex objects, it is possible to apply the method of separating axes to determine whether or not two convex objects intersect (and hence to indicate a conflict). Extensions of this method may be used to allow handling of moving convex objects and are useful for predicting collisions of objects and for computing the first time of contact.

When a conflict is detected, the unmanned air vehicle 100, 200 requesting the merging process maintains its MERGING status, that is it waits until the required trajectory is free of conflicts before executing the task.

Deadlocks can arise in the conflict resolution procedure described above as unmanned air vehicles 100, 200 may all end up frozen in MERGING status as they all await required trajectories to become free (akin to gridlock in road systems). Thus, the plan merger 140 monitors for deadlock situations using the task status information shared between unmanned air vehicles 100, 200. When a deadlock is detected, one of the unmanned air vehicles 100, 200 is selected and is commanded to change its altitude to avoid the conflict. The applicability of this approach for unmanned air vehicles 100, 200 with stationary flight capabilities depends on the scale of the considered scenario. For instance, if we consider a fixed wing unmanned air vehicle 100, 200, it is possible to implement a pseudo-stationary flight with a holding pattern around a waypoint. Then, if the minimum turning radius of the unmanned air vehicle 100, 200 defines a circle which is relatively small with respect to the area where the unmanned air vehicles 100, 200 are flying, a similar technique as for rotorcraft may be adopted.

Regarding the scalability of the method, the messages required by each unmanned air vehicle 100, 200 grow linearly with the number of unmanned air vehicles 100, 200 in the network 50. On the other hand, the protocol adopted guarantees free path traversals even in the presence of communication failures. Continuous connectivity of all the unmanned air vehicles 100, 200 is not required, but if there is a permanent failure in several links, a timeout is used to trigger an alert to the human operator 350.

Now that the plan merging step 686 has been described, FIG. 5 shows that the following step 688 sees the revised task plan 133 of elementary tasks sent to the task manager module 170 where the elementary tasks are queued awaiting execution. The task manager module 170 monitors the status of tasks to determine when pre-conditions of tasks have been met and so to determine when elementary tasks may be forwarded to the executive level 110 for execution, as shown at step 690 in FIGS. 4 and 5. The role of the task manager module 170 will now be described in more detail.

The task manager module 170 comprises a task manager 172 that receives the task plan 133 from the plan builder 132. The task manager 172 also communicates with an elementary tasks supervisor 112 of the executive level 110. Task manager 172 sends elementary tasks 173 to the elementary tasks supervisor 112 for execution. In addition, the elementary tasks supervisor 112 reports to the task manager 172 regarding the status of the elementary tasks 175 and the status of the unmanned air vehicle itself 177.

The task manager 172 also communicates with a synchronization manager 180 of the task manager module 170. The synchronization manager 180 ensures synchronization in the execution of the elementary tasks in the task plan 133 of the unmanned air vehicle 100, and also with respect to the elementary tasks being performed by other unmanned air vehicles 200.

The task manager 172 controls partially ordered sequences of elementary tasks in a consistent, timely and safe manner. For each task request provided by the plan builder 132 not yet included in the task plan 133, two operations to insert that task into the task plan 133 are possible.

Dynamic task insertion allows a request for an elementary task to be inserted in the unmanned air vehicle's current task plan 133 according to the relative order specified for the to-be-inserted task versus the current partial order of the tasks already scheduled in the task plan 133. This operation allows a task to be inserted with pre-conditions and/or post-conditions. Both event-based mechanisms can deal with events related to the evolution of the tasks states defined above, to the reception of messages, to the detection of a given event by the perception system 136, the elapsing of a certain time period, etc. The execution of an elementary task starts when all its pre-conditions are satisfied.

Pre-conditions can be specified either as mandatory or optional. If a pre-condition is mandatory and the pre-condition is no longer satisfiable, then the task is aborted. In contrast, if a pre-condition is optional, the pre-condition is considered satisfied (and hence removed from the task's list of pre-conditions) if it is actually satisfied or if it becomes unsatisfiable (and in this case the task is not aborted). It is also possible to specify post-conditions, i.e. conditions on the state that must be met for the task to be deemed completed.

Dynamic task abortion allows task abortions to be requested dynamically in the current task plan 133, while the task plan 133 is being executed. If the elementary task is already running, then the abortion of the task is an interruption. If the task is not yet running, then the abortion is a cancellation (and the task is de-scheduled). The abortion triggers a propagation mechanism that checks which of the scheduled tasks depends on the aborted task (i.e. those tasks that have a pre-condition expecting a state from the aborted task, such as ENDED). If the dependence is a mandatory pre-condition, then this elementary task is also aborted. If it is an optional pre-condition, then the dependence is removed as if the pre-condition was satisfied and the corresponding task is not aborted.

The management of the pre-conditions and post-conditions is carried out together with the synchronization manager 180. In the interface between the task manager 172 and the synchronization manger 180, there is a simple protocol based on messages.

The synchronization manager 180 is in charge of keeping the dependencies coherent between the different elementary tasks in the current task plan 133 of the unmanned air vehicle 100, and also with the tasks of other unmanned air vehicles 200. When a new task request with pre-conditions and/or post-conditions arrives at the task manager 172, it sends a synchronization information message 181 with the dependencies to the synchronization manager 180, which saves the information in a local database.

The synchronization manager 180 is always checking the state of the tasks in the distributed unmanned air vehicle network 50 via task status messages 183 and 185 and, if there is any change in the state of any tasks, the synchronization manager 180 updates the dependencies database. For instance, if a given task changes its state to ENDED and if this state is a pre-condition for other tasks, the database is updated such that those pre-conditions are changed to satisfied. On the other hand, if all of the post-conditions of a task are satisfied, another message 181 is sent to the task manager 172 that will proceed with the corresponding action to change the status of that task to ENDED.

As described above, elementary tasks are queued at the task manager 172 prior to forwarding to the executive level 110 for execution. Before sending an elementary task to the executive level 110, the task manager 172 sends a query message 181 with the sequence number of the task to the synchronization manager 180. The synchronization manager checks to see if the task may be executed and the answer is sent back to the task manager 172 as another synchronization message 181. If all the pre-conditions of the task are not satisfied, the task manager 172 will keep the task in the queue and send further requests to the synchronization manager 180 periodically.

Once the synchronization manager 180 indicates that an elementary task may be executed, the task manager 172 forwards the elementary task to the elementary tasks supervisor 112 of the executive level 110, as shown at 690 in FIGS. 4 and 5. The elementary tasks supervisor 112 coordinates with a proprietary controller 114 of the executive level 110 to execute the elementary task. For example, the proprietary controller 114 may correspond to a flight control system of the unmanned air vehicle 100, or may correspond to a computer programmed to operate a camera.

As shown at 695, the mission ends once all unmanned air vehicles 100, 200 have completed all the tasks in their task plans 133. Alternatively, the mission may end upon the direction of the human operator 350. That is, the unmanned air vehicles 100, 200 may communicate task status information 133 via their plan builders 132 (or other automatic decision level 120 component), such that the ground control station 300 alerts the human operator 350 when all task plans 133 are empty. The human operator 350 may then decide to end the mission as at 695 or may decide to issue new tasks.

It will be clear to the skilled person that modifications may be made to the embodiments described above without departing from the scope of the invention.

What is claimed:

1. A computer system for use in an unmanned vehicle capable of use in a co-operative network of unmanned vehicles, wherein the computer system is programmed to allow autonomous operation of an unmanned vehicle and comprises:
   an executive level configured to send control signals for controlling propulsion and steering of the unmanned vehicle, and to receive a status signal regarding a status of the unmanned vehicle; and
   an automatic decision level configured to communicate with a ground control station and other unmanned vehicles, to receive task descriptions, to participate in task allocation, and to provide descriptions of tasks to be performed to the executive level for execution, wherein the automatic decision level comprises a task refining module and a task manager module;
   wherein the task refining module is configured to receive an unallocated task description describing a task to be undertaken by one of the unmanned vehicle in the co-operative network, to determine if the unmanned vehicle is able to perform the task, and to calculate an execution cost for the unmanned vehicle to execute that task; and
   wherein the task manager module is configured to receive elementary task descriptions, store the elementary task descriptions and forward the elementary task descriptions in a format suitable for the executive level to execute.

2. The computer system of claim 1, wherein the task refining module is further configured to build a task plan comprising an ordered list of tasks allocated to the unmanned vehicle according to a planned order of execution, and to decompose the task descriptions associated with the allocated tasks into elementary task descriptions for the executive level.

3. The computer system of claim 2, wherein the task refining module comprises a task refining toolbox, a plan builder and a plan merger.

4. The computer system of claim 3, wherein the task refining toolbox is configured to decompose task descriptions associated with the allocated tasks into elementary task descriptions for the executive level and to provide elementary tasks to the plan builder.

5. The computer system of claim 4, wherein the plan builder is configured to order the elementary tasks into the task plan that comprises the list of tasks ordered according to a planned order of execution, and to generate a path to be followed to execute the task plan.

6. The computer system of claim 5, wherein the plan merger is configured to communicate with other unmanned vehicles to ensure that the path will not bring the unmanned vehicle into conflict with other unmanned vehicles.

7. The computer system of claim 5, wherein the plan builder is further configured to amend the task plan if conflicts are found.

8. The computer system of claim 1, wherein the task manager module comprises a task manager and a synchronization manager, wherein the task manager is configured to store elementary tasks with associated pre-conditions to be fulfilled before a corresponding task can be executed, the synchronization manager is configured to monitor the status of the unmanned vehicle to determine when the pre-conditions of an elementary task are fulfilled, and the task manager is configured to forward an associated elementary task description to the executive level for execution when the pre-conditions are fulfilled.

9. The computer system of claim 8, wherein the executive level is configured to provide task status data and/or unmanned vehicle status data derived from the status signal, and wherein the synchronization manager is configured to use that data to determine when the pre-conditions are fulfilled.

10. The computer system of claim 8, wherein the task refining module is configured to receive a pre-allocated task description describing a task specifically allocated to the unmanned vehicle in addition to tasks allocated through an auction, to build a task plan comprising an ordered list of tasks allocated to the unmanned vehicle, including both pre-allocated tasks and tasks allocated by auction, according to a planned order of execution.

11. The computer system of claim 1, wherein the automatic decision level further comprises a task allocation module, the task allocation module being configured:
(a) to operate as a bidder in an auction by forwarding the execution cost as a bid to another unmanned vehicle and, if successful, to receive a task allocation message informing the unmanned vehicle that it won the auction and so has been allocated the task; and
(b) to operate as an auctioneer by receiving bids from other unmanned vehicles where each bid corresponds to the execution cost for the associated unmanned vehicle to execute the task, and to select the bid with a lowest execution cost and to send a task allocation message to the other unmanned vehicle associated with the selected bid to inform that unmanned vehicle that it has been allocated the task.

12. An unmanned vehicle capable of use in a co-operative network of unmanned vehicles, comprising a computer system programmed to allow autonomous operation of the unmanned vehicle, wherein the computer system comprises:
an executive level configured to send control signals for controlling propulsion and steering of the unmanned vehicle, and to receive a status signal regarding a status of the unmanned vehicle; and
an automatic decision level configured to communicate with a ground control station and other unmanned vehicles, to receive task descriptions, to participate in task allocation, and to provide descriptions of tasks to be performed to the executive level for execution, wherein the automatic decision level comprises a task refining module and a task manager module;
wherein the task refining module is configured to receive an unallocated task description describing a task to be undertaken by one of the unmanned vehicle in the co-operative network, to determine if the unmanned vehicle is able to perform the task, and to calculate an execution cost for the unmanned vehicle to execute that task; and
wherein the task manager module is configured to receive elementary task descriptions, store the elementary task descriptions and forward the elementary task descriptions in a format suitable for the executive level to execute.

13. The unmanned vehicle of claim 12, further comprising a sensor operable to sense information regarding a status of the unmanned vehicle.

14. The unmanned vehicle of claim 13, further comprising a perception system with surveillance sensors for gathering data and a data fusion engine to fuse data provided by the surveillance sensors.

15. A network comprising a plurality of unmanned vehicles according to claim 14, wherein the unmanned vehicles have a common design of automatic decision level and differing designs of executive levels.

16. A network comprising a plurality of unmanned vehicles according to claim 14, wherein the unmanned vehicles are configured to communicate with each other via automatic decision levels.

17. A method of operating a network of unmanned vehicles, each unmanned vehicle comprising a computer system programmed to allow autonomous operation of the unmanned vehicle that is divided into an executive level configured to control motion of the unmanned vehicle and an automatic decision level configured to communicate with a ground control station and other unmanned vehicles and to provide descriptions of tasks to be performed to the executive level for execution, the method comprising:
transmitting a set of task descriptions to the unmanned vehicles;
each unmanned vehicle determining if the unmanned vehicle is able to perform a task, and calculating an execution cost for the unmanned vehicle to execute the task;
allocating the tasks by holding an auction to allocate each task in which each bid corresponds to the execution cost of the unmanned vehicle to perform the task, the bid with a lowest execution cost is selected, and a winning unmanned vehicle is notified of their successful bid;
each unmanned vehicle building a task plan comprising an ordered list of tasks allocated to the unmanned vehicle according to a planned order of execution, decomposing the task descriptions associated with the allocated tasks into elementary task descriptions for the executive level, and providing the elementary task descriptions to the executive level in a format suitable for the executive level to execute the task; and
each unmanned vehicle executing the tasks it has been allocated.

18. The method of claim 17, comprising each unmanned vehicle using its task plan to generate a path to be followed to execute the task plan, the unmanned vehicles sharing descriptions of their paths and ensuring that the paths will not cause conflicts between the unmanned vehicles.

19. The method of claim 17, wherein some tasks have associated pre-conditions to be fulfilled before execution of the task, the method comprising the unmanned vehicles sharing task status information, and an unmanned vehicle using shared task status information to determine that the pre-conditions of an allocated task of the unmanned vehicles have been fulfilled and executing that task.

* * * * *